Figure 1:
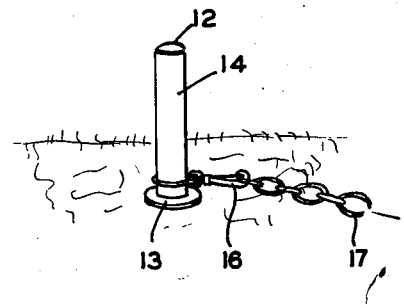

June 14, 1949.  M. SULLIVAN  2,472,926
TETHERING POST
Filed Dec. 6, 1945

Inventor
MICHAEL SULLIVAN

By Francis J. Klempay
Attorney

Patented June 14, 1949

2,472,926

UNITED STATES PATENT OFFICE 2,472,926

TETHERING POST

Michael Sullivan, Youngstown, Ohio

Application December 6, 1945, Serial No. 633,070

2 Claims. (Cl. 119—121)

This invention relates to a device useful in the tethering of animals at pasture and more particularly to a post or stake for so securing such animals.

The principal object of the invention is to provide a device of the kind described which materially reduces the probability of the animal's tethering chain becoming wrapped about the stake thus restricting the area over which the animal may graze.

Another object of the invention is to provide a tethering post having the characteristics above mentioned and to which the tethering chain of the animal may be readily attached and from which it may be readily detached.

Still another object of the invention is to provide guard means associated with the tethering post to prevent any damage being done to its operative parts by any inadvertent, excessive force applied during the use of the device.

Further objects of the invention will appear as the following detailed description proceeds. The drawing is intended to show only one embodiment of the invention. Various materials and/or methods of manufacture may necessitate departure from the illustrated form. It is therefore not intended to limit the invention to the embodiment shown but rather to define such limits in the appended claim.

For a better understanding of the invention attention is directed to the drawing wherein like reference characters denote like parts throughout the views.

Figure 2:
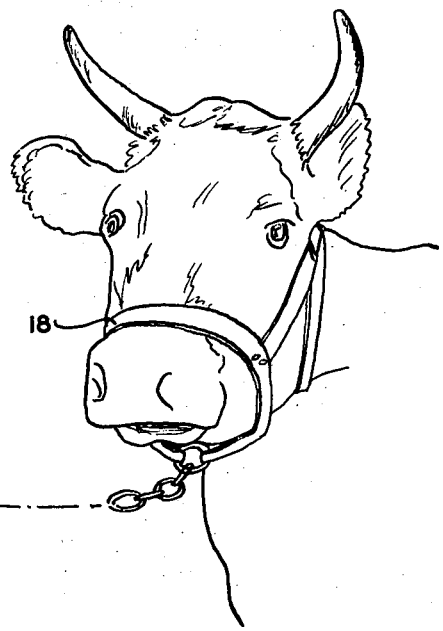
Figure 2:
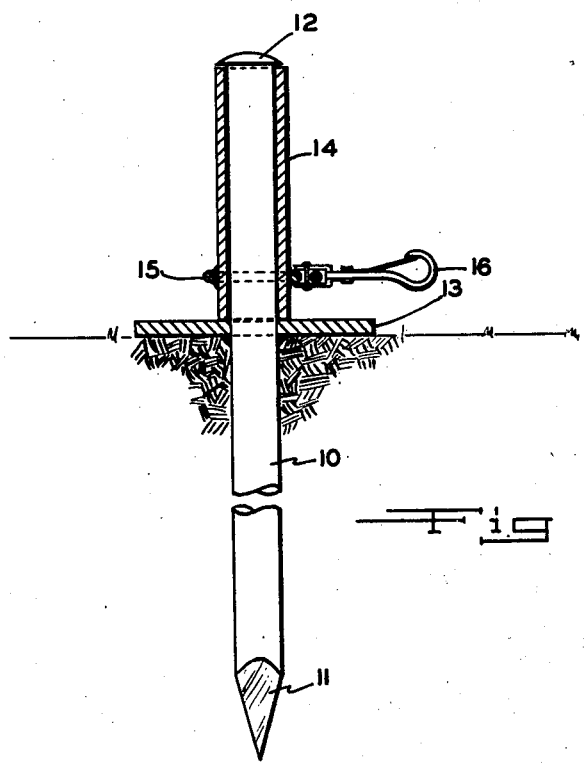

In the drawing:

Figure 1 is a perspective view showing the device of the invention in actual use; and Figure 2 is a view, partly in section, showing the component parts of the invention.

Referring now to the drawing in detail, numeral 10 designates a central stake or post of diameter and length appropriate to the strength of the animal being set out to graze. Numeral 11 designates a sharpened lower end of post 10 and 12 indicates an enlarged head formed at the upper end of said post. A relatively large plate or washer 13 is welded or otherwise rigidly attached to post 10 which, in addition to the function to be pointed out below, serves to limit the distance to which the latter may be driven into the ground. A rotatable sleeve 14, made for example of steel pipe, is assembled on shaft 10, and is of suitable length to preclude its being held fast between head 12 and plate 13. A clevis or ring 15 is securely attached to sleeve 14 and serves as anchorage means for a spring clasp 16 to which is detachably fixed one end of tethering chain 17. To the outer end of chain 17 is secured a halter 18 for securing the animal.

The plate or disk 13 provides a smooth annular base on which the sleeve 14 is rotatably supported, thus enabling the sleeve to turn freely about the axis of pin 10. The member 13, moreover, provides a suitable wearing surface for abutting the lower end of the sleeve 14 whereby the device is rendered rugged and durable in use.

The free motion of the sleeve 14 and its attached clip 16 about the anchoring part 10 will be seen to provide a means for securing an animal's tethering chain without affording it any obstacle about which to become entangled. Free scope is thus given to the grazing animal so that it may reach all parts of the pasturage within the limits of the chain. Since washer 13 is attached to part 10 in spaced relation to head 12 it will be seen that any excessive pounding on 12 attendant to driving it into the ground will in no way affect the free rotation of sleeve 14.

An important feature of the present invention is the rigidly securing of the ring 15 to the lower portion of the sleeve 14. This construction spaces outwardly the first joint in the tethering chain, making it impossible to entangle the chain about the post. I have observed that in conventional tethering posts where the chain is swiveled directly on the post, entanglement will occur unless the chain is kept taut at all times. As the continued maintenance of such tautness is not possible, entanglement does occur. In the present construction the chain will readily unwind or unravel upon the application of a slight pulling force even though it has become wound about the sleeve 14. By securing the ring 15 to the lower portion of the sleeve 14 the overturning movement applied to the pin 10 by tension in the chain 17 is not great and the pin is accordingly less likely to be twisted out of the ground.

It should now be apparent that I have provided an improved means for tethering animals which accomplishes the objects initially set out. In addition to its utility the device is reliable in operation and exceedingly simple in its mechanical structure.

The article of the invention may readily be produced by forging and/or welding, brazing, stamping, etc., from any suitable materials.

The above specifically described embodiment of the invention should be considered as illustrative only as obviously many changes may be made therein without departing from the spirit or scope of the invention. Reference should therefore be had to the appended claims in determining the scope of the invention.

What I claim is:

1. A tethering post for the staking out of an animal comprising a solid cylindrical metal pin of uniform diameter, said pin having an integral head provided with a substantially segmental spherical top at its upper end and a sharpened lower end which is adapted to be driven into the ground, said head having a flat under surface, an elongated metal sleeve of uniform external diameter and of uniform internal diameter, the internal diameter of said sleeve being substantially the same as the diameter of said pin, whereby it is freely rotatable upon an extended bearing surface of said pin, said sleeve having ends whose surfaces are at right angles to the longitudinal axis thereof, a plate rigidly attached to said post at a position which is more than one-half the distance from the said sharpened end to the said head, the upper flat surface of said plate and the under flat surface of said head forming thrust bearings for the ends of said sleeve, the said surface of the upper end of said sleeve lying in juxtaposed position with the under surface of said head and the said surface of the lower end of said sleeve lying in juxtaposed position with the upper surface of said plate, said plate limiting the penetration of said pin in the ground, a ring rigidly attached to said sleeve in a position intermediate the ends of said sleeve, a spring clasp, and attaching means connecting said spring clasp to said ring, the diameter of the head not exceeding the diameter of the sleeve.

2. A tethering post for the staking out of an animal comprising a solid cylindrical metal pin of uniform diameter, said pin having an integral head provided with a substantially segmental spherical top at its upper end and a sharpened lower end which is adapted to be driven into the ground, said head having a flat under surface, an elongated metal sleeve of uniform external diameter and of uniform internal diameter, the internal diameter of said sleeve being substantially the same as the diameter of said pin, whereby it is freely rotatable upon an extended bearing surface of said pin, said sleeve having ends whose surfaces are at right angles to the longitudinal axis thereof, a plate rigidly attached to said post at a position which is more than one-half the distance from the said sharpened end to the said head, the upper flat surface of said plate and the under flat surface of said head forming thrust bearings for the ends of said sleeve, the said surface of the upper end of said sleeve lying in juxtaposed position with the under surface of said head and the said surface of the lower end of said sleeve lying in juxtaposed position with the upper surface of said plate, said plate limiting the penetration of said pin in the ground, a ring rigidly attached to said sleeve in a position intermediate the ends of said sleeve, a spring clasp, and attaching means connecting said spring clasp to said ring, the diameter of the head not exceeding the diameter of the sleeve, said attaching means extending radially from said sleeve.

MICHAEL SULLIVAN.

REFERENCES CITED

The following references are of record in the file of this patent:

UNITED STATES PATENTS

| Number | Name | Date |
| --- | --- | --- |
| 62,761 | Lincoln et al. | Mar. 12, 1867 |
| 91,042 | Raiford | June 8, 1869 |
| 219,203 | Blewett | Sept. 2, 1879 |
| 227,675 | Carnes, Sr., et al. | May 18, 1880 |
| 802,411 | Schaaff | Oct. 24, 1905 |
| 1,092,036 | Fry | Mar. 31, 1914 |
| 2,087,176 | Webb | July 13, 1937 |
| 2,360,199 | Cawley | Oct. 10, 1944 |

FOREIGN PATENTS

| Number | Country | Date |
| --- | --- | --- |
| 3,393 | Great Britain | Feb. 14, 1896 |
| 453,621 | Great Britain | June 21, 1935 |